United States Patent [19]

Nanba

[11] Patent Number: 5,038,393

[45] Date of Patent: Aug. 6, 1991

[54] METHOD OF EFFECTIVELY READING DATA WRITTEN ON DATA SHEET, AND DATA READING APPARATUS THEREFOR

[75] Inventor: Hiromi Nanba, Tokorozawa, Japan

[73] Assignee: Kabushiki Kaisha Toshiba, Kawasaki, Japan

[21] Appl. No.: 627,923

[22] Filed: Dec. 17, 1990

Related U.S. Application Data

[63] Continuation of Ser. No. 213,300, Jun. 28, 1988, abandoned.

[30] Foreign Application Priority Data

Jun. 30, 1987 [JP] Japan ............... 62-163058

[51] Int. Cl.$^5$ .............................. G06K 9/20
[52] U.S. Cl. ........................ 382/61; 235/436; 382/46; 382/65
[58] Field of Search ............ 382/61, 58, 59, 65, 382/46; 235/436, 437; 270/54

[56] References Cited

U.S. PATENT DOCUMENTS

| | | | |
|---|---|---|---|
| 3,744,025 | 7/1973 | Bilyutay | 382/59 |
| 4,589,144 | 5/1986 | Namba | 382/61 |
| 4,760,247 | 7/1988 | Keane et al. | 382/61 |
| 4,811,416 | 3/1989 | Nakamura | 382/61 |
| 4,823,395 | 4/1989 | Chikauchi | 382/61 |

FOREIGN PATENT DOCUMENTS

| | | | |
|---|---|---|---|
| 57-143684 | 4/1982 | Japan | 382/61 |
| 58-107992 | 6/1983 | Japan | |

OTHER PUBLICATIONS

Balm et al., "Byte Sequence Reversal", *IBM Tech. Disc. Bulletin*, vol. 14, No. 8, Jan. 1972, pp. 3456-2457.
"OCR-Facsimile Integrated System", Bulletin of Institute of Electronics and Communication Engineers of Japan, Issued in 1981 System Division National Meeting, p. 87.

*Primary Examiner*—David K. Moore
*Assistant Examiner*—Joseph Mancuso
*Attorney, Agent, or Firm*—Foley & Lardner

[57] ABSTRACT

In a character reading apparatus, a slip image having three reference marks printed at three of the four predetermined corners of the slip is stored in an image buffer. The image in the image buffer is scanned to detect the three reference marks. A feed orientation of the slip is determined on the basis of the layout of the three reference marks. Data can be read on the basis of the detected three reference marks and the determined feed orientation of the slip.

14 Claims, 4 Drawing Sheets

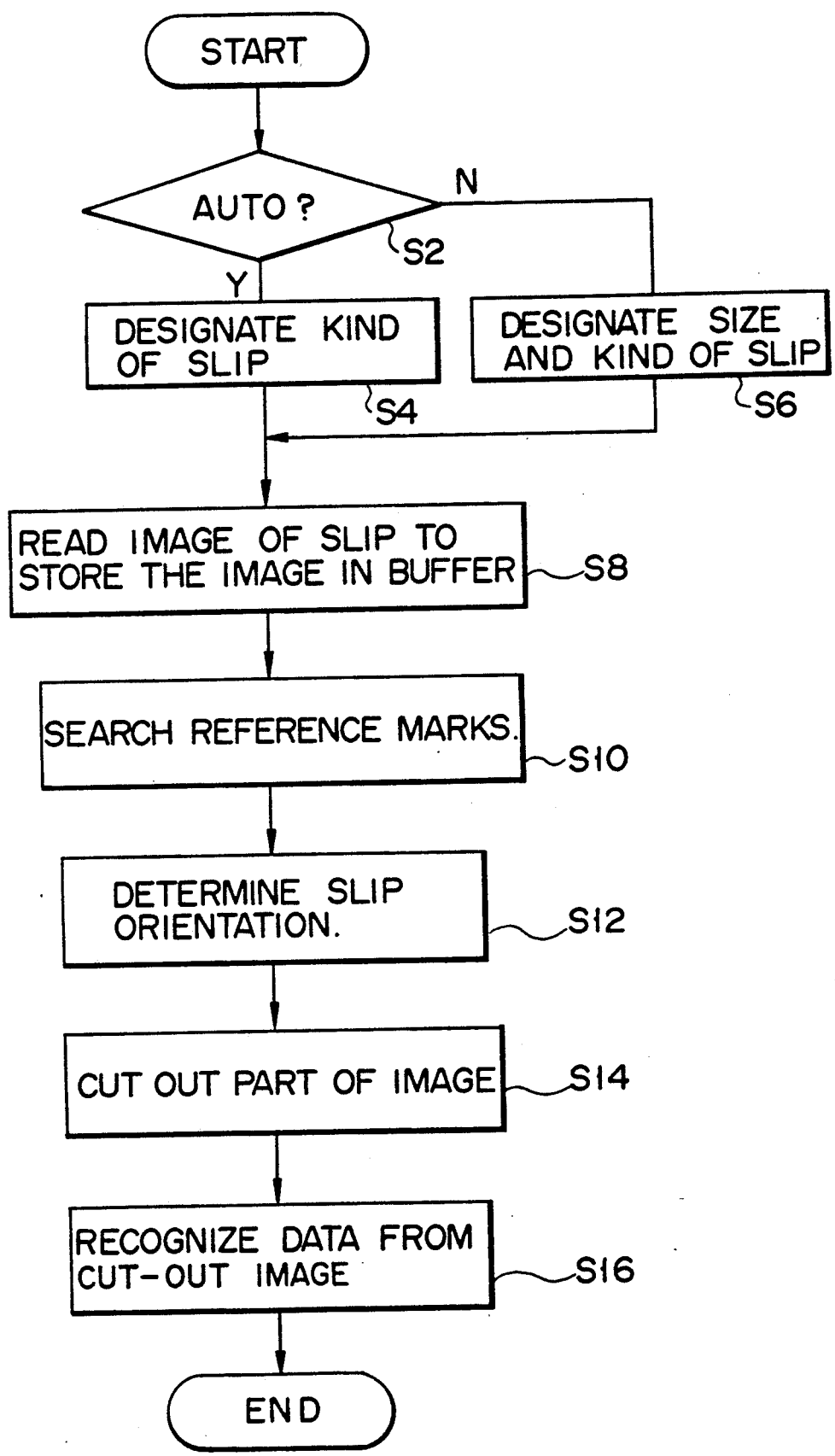
F I G. 7

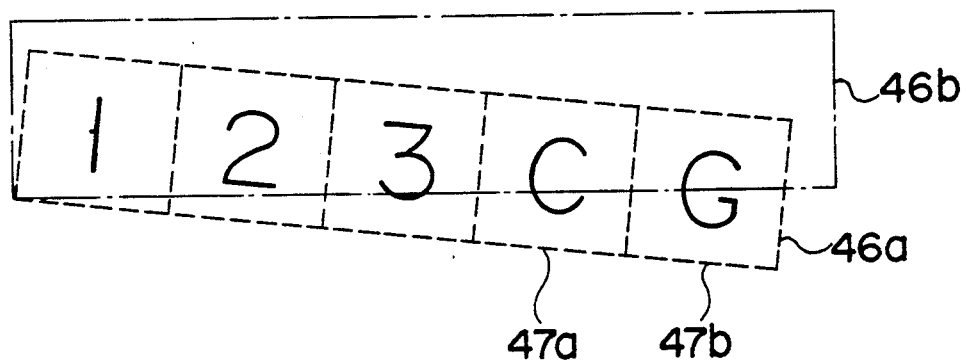
F I G. 8

METHOD OF EFFECTIVELY READING DATA WRITTEN ON DATA SHEET, AND DATA READING APPARATUS THEREFOR

This application is a continuation of application Ser. No. 07/213,200, filed June 28, 1988 now abandoned.

BACKGROUND OF THE INVENTION

1. Field of the Invention

The present invention relates to a method of effectively reading data written on a data sheet, such as a slip, and a data reading apparatus therefor and, more particularly, to a data reading apparatus which can perform optimal reading of a data sheet fed with any orientation.

2. Description of the Related Art

In a conventional data reading apparatus for reading data such as characters written on a data sheet such as a slip, the reading direction of the slip is limited to a vertical direction from the upper portion to the lower portion of the slip. Data is read, i.e., a one-line image obtained by causing a line image sensor such as a CCD scanner to photoelectrically convert light into electrical signals while the slip is being fed. The electrical signals are stored in an image buffer. For this reason, line marks 11a, 11b, 11c, and so on must be printed in advance on the slip in units of lines, as shown in FIG. 1. Line marks 11a, 11b, 11c, and so on are also called timing marks.

When a slip is fed and almost reaches a reading station in a conventional data reading apparatus, line mark 11a on the first line is detected, and feeding of the slip is interrupted. Data of the first line is then read. When the data of the first line is accurately read, the slip is fed to a position so that the next line mark 11b can be detected. In this manner, line data reading is sequentially performed on the basis of line marks 11a, 11b, 11c, and so on, and all data of one slip are completely read.

The above line marks must be printed in accordance with kinds of slips serving as objects of interest. Therefore, design flexibility of slips used for conventional data reading apparatuses is undesirably limited.

In recent years, another conventional data reading apparatus is commercially available. In addition to feeding in one direction described above (to be referred to as a normal direction hereinafter), in this apparatus, a slip can be fed in a state wherein the slip is rotated counterclockwise through 90° (to be referred to as a counterclockwise 90° direction hereinafter), a state wherein the slip is rotated clockwise through 90° (to be referred to as a clockwise 90° direction hereinafter), or an inverted direction (to be referred to as a 180° direction hereinafter).

In this apparatus, however, a slip orientation must be registered in read control information (to be referred to as FC information hereinafter) prior to feeding of the slip. For example, when slips having various orientations are fed, the corresponding FC information must be set, resulting in cumbersome operations.

SUMMARY OF THE INVENTION

The present invention has been made in consideration of the above situation, and has as its object to provide a method of effectively reading data written on a data sheet fed with any orientation illustrated in FIGS. 4A to 4D without forming line marks on the data sheet and a data reading apparatus therefor.

The data reading apparatus comprises a buffer for storing an input data sheet image, a scanner for generating a data sheet image corresponding to data written on the data sheet and outputting the data sheet image to the buffer, the data sheet having at least one reference mark at a predetermined position, an orientation determining section for determining an orientation of the data sheet on the basis of a position of the buffer at which a reference mark image corresponding to the reference mark is stored, a range designating section for designating a first range of the data sheet image stored in the buffer, and a recognizing section for recognizing written data in accordance with the image falling within the designated first range.

The orientation determining section determines a second range of the stored data sheet image and determines the orientation of the data sheet according to a position within the designated second range at which the reference mark image is located. The second range is determined in accordance with a data sheet position of the reference mark.

The method comprises the steps of: generating a data sheet image corresponding to data written on the data sheet and storing the data sheet image in a buffer, the data sheet having at least one reference mark at a predetermined position; determining an orientation of the data sheet from a position of the buffer at which a reference mark image corresponding to the reference mark is stored; determining a first range of the stored data sheet image in accordance with the determined orientation; and recognizing the written data in accordance with the image falling within the designated first range.

A gradient of the data sheet is determined by the position of each reference mark, and the first range is corrected according to the determined gradient.

According to the present invention as described above, three reference marks are printed on the data sheet. An image of the data sheet is stored in the image buffer. This image is scanned to detect the three reference marks. The orientation of the data sheet is determined on the basis of the layout of these three reference marks. Therefore, reading of a data sheet fed with any orientation illustrated in FIGS. 4A to 4D can be performed, and the conventional line marks can be omitted.

The three reference marks are used to correct data even if elongation/contraction or gradient occurs in data during reading.

In addition, a drop-out color is not read, and data can be effectively compressed when data is transmitted using a facsimile system.

BRIEF DESCRIPTION OF THE DRAWINGS

FIG. 7 is a flow chart for explaining an operation of the data reading apparatus shown in FIG. 2; and FIG. 8 is a view for explaining correction of a gradient of the slip.

DETAILED DESCRIPTION OF THE PREFERRED EMBODIMENTS

A data reading apparatus according to an embodiment of the present invention will be described in detail with reference to the accompanying drawings.

First of all, an arrangement of the data reading apparatus will be described with reference to FIG. 2.

Figure 2:
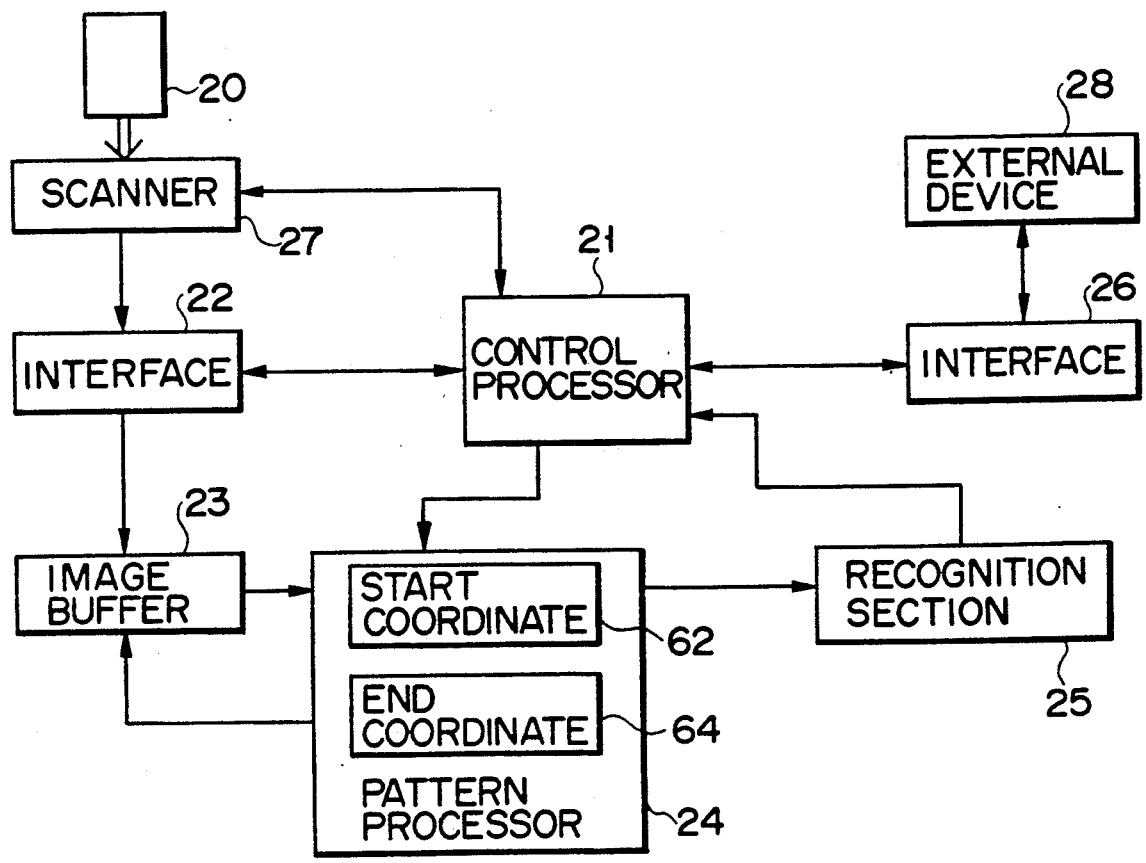
FIG. 2 is a block diagram showing an arrangement of a data reading apparatus according to an embodiment of the present invention.

Referring to FIG. 2, scanner 27 optically scans slip 20 fed with any orientation to obtain an image in accordance with a control signal output from control processor 21. When scanner 27 detects the left end of the slip, it outputs a left end detection signal to control processor 21. When scanner 27 detects the right end of the slip, it outputs a right end detection signal. When scanner 27 detects the lower end of the slip, it outputs a vertical end detection signal. In response to a control signal output from processor 21, interface 22 controls an interface with scanner 27 and causes image buffer 23 to store an image obtained by scanner 27. Image buffer 23 has a capacity enough to store an image of one slip.

Figure 1:
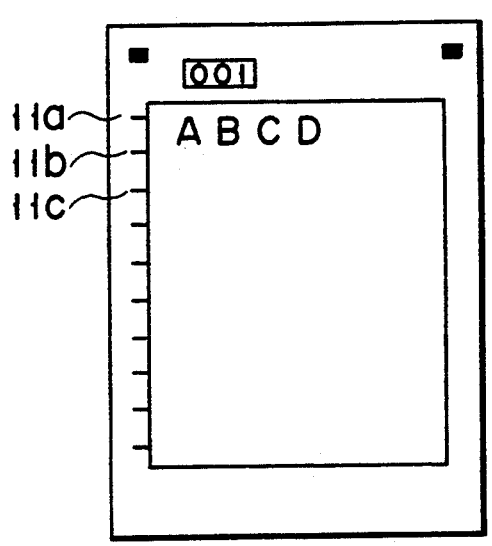
FIG. 1 is a front view showing a conventional slip.
Figure 3:
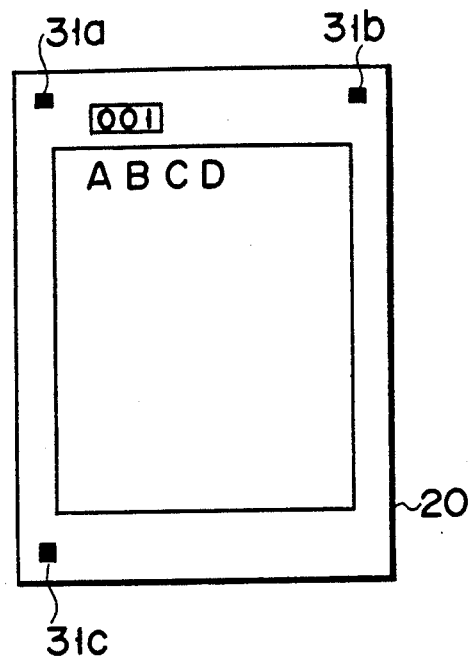
FIG. 3 is a front view showing a slip used in this embodiment.

Pattern processor 24 includes start coordinate register 62 and end coordinate register 64. When the image is stored in image buffer 23, processor 24 scans the range designated by the contents of registers 62 and 64. Processor 24 scans the image in image buffer 23 in accordance with a control signal output from processor 21 to detect reference marks 31a, 31b, and 31c of the slip (FIG. 3). When reference marks 31a, 31b, and 31c are detected, a slip orientation is determined on the basis of the layout of reference marks 31a, 31b, and 31c. Thereafter, an image area, including character patterns is extracted from image buffer 23 in accordance with the determined orientation. The extracted image area is output to recognition section 25.

Recognition section 25 performs recognition of characters written in the image area extracted by pattern processor 24. A recognition result is output to control processor 21. Interface 26 controls an interface with external device 28 such as a host computer. The recognition result output from processor 21 is output to external device 28. Control processor 21 controls the operation of the overall data reading apparatus and outputs a control signal to interface 22, image buffer 23, pattern processor 24, recognition section 25, and interface 26.

An operation of the character reading apparatus having the above arrangement will be described below.

Control processor 21 determines in step S2 (FIG. 7) whether a slip size is automatically recognized. If YES in step S2, the kind of slip is input as read control information (FC information) in step S4. However, if NO in step S2, the size and kind of slip are input as FC information in step S6. Thereafter, slip 20 having any orientation is fed to and read by scanner 27.

Figure 5:
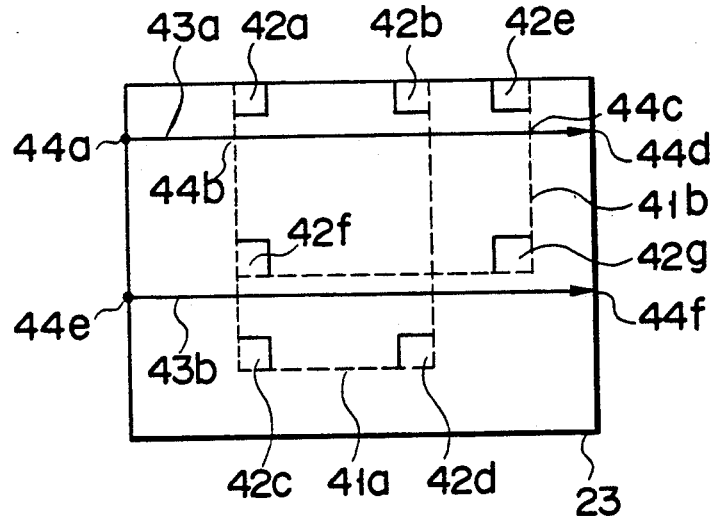
FIG. 5 is a view showing a storage state of a read slip image.

As shown in FIG. 5, for example, when the slip is fed with orientation 41b, the slip is scanned by scanner 27 from point 44a to point 44d (line 43a), and a line image of the slip is obtained. In this case, when a color change point, i.e., point 44b is detected (i.e., the left end of the slip is detected), scanner 27 outputs a left end detection signal to control processor 21. When scanning continues and the right end of the slip is detected at point 44c, scanner 27 outputs a right end detection signal to processor 21. The resultant line image is stored in image buffer 23.

Upon progress of image reading, when line 43b is scanned and no image of the slip is detected, scanner 27 outputs a vertical end detection signal. Processor 21 detects a slip size and a storage position of the image in image buffer 23 in an auto mode in accordance with the left end detection signal, the right end detection signal, and the vertical end detection signal. When the image of the slip is read such that left end 44b of the slip coincides with point 44a in image buffer 23, the left end detection signal need not be generated.

Reference marks 31a, 31b, and 31c are printed on the slip, as shown in FIG. 3. Reference marks 31a, 31b, and 31c are printed at predetermined three of the four corners of the slip. In this embodiment, reference mark 31a is printed at the upper left corner which is determined with reference to the upper and left sides of the slip. Similarly, reference mark 31b is printed at the upper right corner which is determined with reference to the upper and right sides, and reference mark 31c is printed at the lower left corner which is determined with reference to the lower and left sides. However, the layout of the reference marks is not limited to this.

Figures 4A, 4B, 4C, 4D:
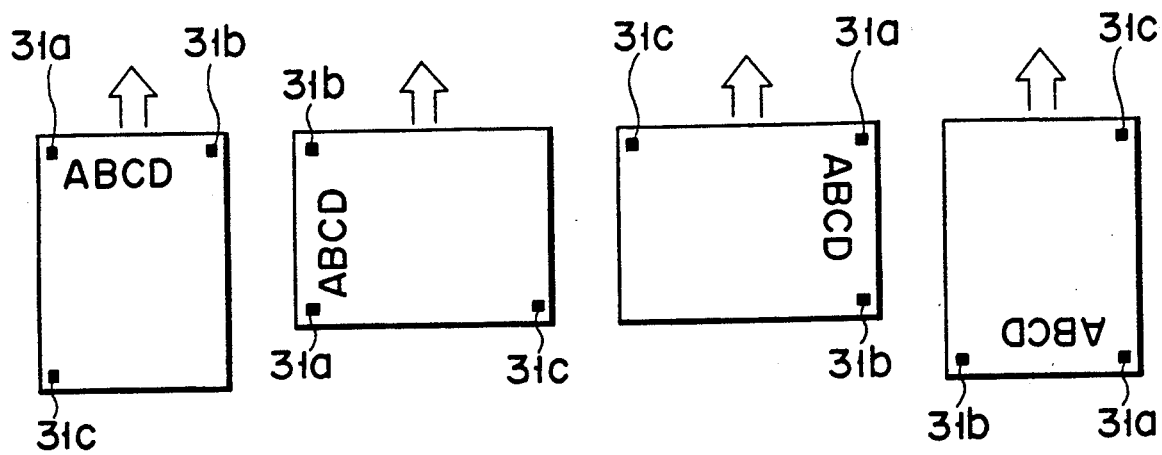
FIGS. 4A to 4D are views showing the relationship between slip orientations and the reference marks.

FIGS. 4A to 4D are views showing the relationship between the slip orientations and reference marks 31a, 31b, and 31c. FIG. 4A shows a slip state in the normal direction of the slip; FIG. 4B, in the counterclockwise 90° direction thereof; FIG. 4C, in the clockwise 90° direction thereof; and FIG. 4D, in the 180° direction. A variety of layouts of reference positions 31a, 31b, and 31c in FIGS. 4A to 4D can be understood. Referring to FIG. 5, reference numeral 41a denotes a slip image when the slip is fed in the normal or 180° direction; and 41b, in the counterclockwise or clockwise 90° direction. Reference numerals 42a to 42g denote areas including reference marks 31a, 31b, and 31c with respect to images 41a and 41b. These areas can be easily set if the slip size is known in advance.

Figure 6:
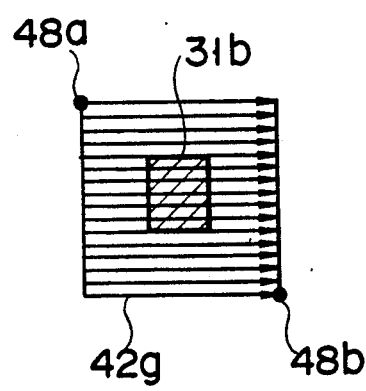
FIG. 6 is a view for explaining a method of detecting the reference marks.

In step S10, preset areas 42a to 42g are scanned and reference marks 31a, 31b, and 31c are detected by processor 24. The slip orientation is determined on the basis of the layout of reference marks 31a, 31b, and 31c. For example, if the reference marks (31a, 31b, and 31c) are detected in areas 42a, 42b, and 42c, the slip orientation is determined to correspond to the normal direction. In this case, the slip size information is supplied from processor 21 to processor 24. A range to be scanned is set in registers 62 and 64 by processor 24 in accordance with the information from processor 21. Thereafter, pattern processor 24 horizontally scans areas 42a to 42d or areas 42a and 42e to 42g in image buffer 23 and counts the number of black bits on each scanning line, as shown in FIG. 6, thereby forming a histogram of horizontal black bits. When the histogram of horizontal black bits is formed, the presence/absence of a reference mark in each area is determined, and upper and lower ends of the reference marks are obtained, and a central position along the vertical direction is calculated. Image buffer 23 is vertically scanned to count the number of black bits of each scanning line, thereby forming a histogram of vertical black bits. After the histogram of vertical black bits is formed, top and bottom ends of the reference marks are obtained and the central position in the vertical direction is calculated in step S12. Coordinates of the reference mark are defined by the vertical and horizontal central positions of the reference marks. If a reference mark is included in a given area, its central position is calculated. The positions of reference marks 31a, 31b, and 31c of the slip in image buffer 23 are detected. Therefore, the orientation of the slip can be determined in accordance with the layout of reference marks 31a, 31b, and 31c.

When the slip orientation is determined, in step S14, pattern processor 24 corrects a range to be designated, in accordance with the gradient and the distances between reference marks 31a, 31b, and 31c which are detected in image buffer 23. When a slip image is read while the slip is being inclined, an image represented by 46a in FIG. 8 is stored in buffer 23. When range 46b is designated in order to perform character recognition, character 47a cannot be discriminated from character 47b. In addition, slight elongation/contraction of the image may occur during reading of scanner 27. For these reasons, range 46a is designated using the detected reference marks 31a, 31b, and 31c. The range designation is performed in the same manner as reference mark detection. In this case, the range may include a few characters or only one character. An image within the designated range is output to recognition section 25.

In step S14, recognition section 25 performs character recognition using the image within the designated range. A recognition result is output to control processor 21. The recognition result is output to external device 28 through control processor 21 and interface 26.

According to this embodiment, by detecting the three reference marks printed on the slip, the slip orientation can be determined by the layout of the three reference marks. Unlike in the conventional arrangement, FC information need not be prepared for each orientation of the slip. OCR operation efficiency can be greatly improved. In addition, if the range to be read is registered in advance in the FC information, line reading can be performed on the basis of the three reference marks. Therefore, unlike in the conventional arrangement, the line marks need not be printed on the slip in units of lines. Design flexibility of the slip can be improved.

Even if a slip having an unknown size is fed, its size can be detected by a detection signal from the scanner. In place of the detection signal, an image stored in the buffer may be scanned to detect the reference marks.

Since the range of image subjected to character recognition is determined by the kind of slip according to this embodiment, the kind of slip is input as FC information in advance. However, the kind of slip may be determined in accordance with the size or printed positions of the reference marks. In this case, an identification result from the pattern processor is supplied to the control processor.

What is claimed is:

1. A data reading apparatus for reading data written on a sheet set in a plurality of reading orientations, comprising:
    image data generating means for scanning the sheet on which a plurality of reference marks are provided for determining the reading orientation of the sheet and generating image data corresponding to the data written on the sheet, the reading orientations including normal, counterclockwise 90 degree, clockwise 90 degree, and 180 degree directions;
    buffer means for storing the image data generated by said image data generating means;
    means for detecting a size of the sheet and position of the sheet stored in said buffer means;
    determining means for determining the reading orientation of the sheet in accordance with the reference marks provided on the sheet stored in said buffer means;
    holding means for holding start and end coordinate data of a reading operation in accordance with the size of the sheet;
    range designating means for designating a first range of the image data stored in said buffer means in accordance with the start and end coordinate data held in said holding means; and
    recognizing means for recognizing the image data corresponding to the data written on the sheet within the designated first range.

2. An apparatus according to claim 1, wherein each designated second range is predetermined in accordance with a position of the reference mark on the data sheet.

3. An apparatus according to claim 1, wherein a plurality of kinds of data sheets having the same size are used, and said range designating means includes means for designating the first range in accordance with the kind and determined orientation of the data sheet.

4. An apparatus according to claim 3, wherein every data sheet has at least one reference mark at a predetermined position therefor, said apparatus further comprising means for detecting, from the stored position of the reference mark image in said buffer means, the kind of data sheet read by said image generating means.

5. An apparatus according to claim 1, wherein a plurality of kinds of data sheets are used, and said image generating means further comprises means for generating a detection signal in response to generation of the data sheet image, said apparatus further comprising size determining means for determining the size of the each data sheet in accordance with the detection signal.

6. An apparatus according to claim 1, wherein the number of reference marks is at least three, and said range designating means includes designating means for designating the first range in accordance with the determined orientation and the stored positions of the reference mark images in said buffer means.

7. An apparatus according to claim 6, wherein said designating means includes means for determining a gradient of the data sheet in accordance with the stored positions of the reference mark images in said buffer means and for correcting the first range in accordance with the determined gradient.

8. A data reading method for reading data written on a sheet set in a plurality of reading orientations, comprising the steps of:
    (a) scanning a sheet on which a plurality of references marks are provided for determining the reading orientation of the sheet and generating image data corresponding to the data written on the sheet, the reading orientations including normal, counterclockwise 90 degree, clockwise 90 degree, and 180 degree directions;
    (b) storing the image data generated by said image data generating means in a buffer;
    (c) detecting a size of the sheet and position of the sheet stored in the buffer;
    (d) determining the reading orientation of the sheet in accordance with the reference marks provided on the sheet stored in the buffer;
    (e) determining a start and end coordinate data of a reading range in accordance with the size of the sheet;
    (f) designating a first range of the image data stored in the buffer in accordance with the start and end coordinate data; and (g) recognizing the image data corresponding to the data written on the sheet within the designated first range.

9. A method according to claim 8, wherein each designated second range is predetermined in accordance with a marked position of the reference mark on the data sheet.

10. A method according to claim 8, wherein a plurality of kinds of data sheets having the same size are used, and the step of designating the first range includes designating the first range in accordance with the kind and determined orientation of the data sheet.

11. A method according to claim 10, wherein every data sheet has at least one reference mark at a predetermined position thereon, said method further comprising detecting the kind of data sheet in accordance with the stored position of the reference mark image in said buffer means.

12. A method according to claim 8, wherein a plurality of kinds of data sheets are used, and the step of generating the data sheet image further comprises generating a detection signal in response to generation of the data sheet image, the method further comprising determining the size of the data sheet from the detection signal.

13. A method according to claim 8, wherein the number of reference marks is at least three, and the step of designating the first range includes designating the first range in accordance with the determined orientation and the stored positions of the reference mark images.

14. A method according to claim 13, wherein the step of designating the first range includes determining a gradient of the data sheet in accordance with the stored positions of the reference mark images in said buffer means and correcting the first range in accordance with the determined gradient.

* * * * *